SILICON CARBIDE FURNACES AND PLANTS

Original Filed Feb. 23, 1967 4 Sheets-Sheet 1

INVENTORS
Wilbur T. Bolkcom
and William E. Knapp
by their attorneys
Buell & Blenko & Ziesenheim

SILICON CARBIDE FURNACES AND PLANTS

Original Filed Feb. 23, 1967 4 Sheets-Sheet 2

INVENTORS
Wilbur T. Bolkcom
and William E. Knapp
by their attorney,
Buell, Blenko & Ziesenheim

SILICON CARBIDE FURNACES AND PLANTS

Original Filed Feb. 23, 1967 4 Sheets-Sheet 3

INVENTORS
Wilbur T. Bolkcom
and William E. Knapp
by their attorneys
Buell Blenko & Ziesenheim

SILICON CARBIDE FURNACES AND PLANTS

Original Filed Feb. 23, 1967 4 Sheets-Sheet 4

INVENTORS
Wilbur T. Bolkcom
and William E. Knapp
by their attorney,
Buell Blenko & Ziesenheim

United States Patent Office

Re. 27,018

Reissued Jan. 5, 1971

27,018

SILICON CARBIDE FURNACES AND PLANTS

Wilbur T. Bolkcom, Pittsburgh, Pa., and William E. Knapp, Allison Park, Pa., (both % American Metallurgical Products Co., 9800 McKnight Road, Pittsburgh, Pa. 15237)

Original No. 3,432,605, dated Mar. 11, 1969, Ser. No. 618,034, Feb. 23, 1967. Application for reissue Nov. 20, 1969, Ser. No. 878,283

Int. Cl. H05b *3/02, 3/62*

U.S. Cl. 13—20 14 Claims

Matter enclosed in heavy brackets [ ] appears in the original patent but forms no part of this reissue specification; matter printed in italics indicates the additions made by reissue.

ABSTRACT OF THE DISCLOSURE

A silicon carbide manufacturing plant for manufacturing silicon carbide in a movable furnace at one area, discharging the furnace in a second area and loading in a third area. An electrical power source is provided having a main trackway adjacent the power source with a furnace car movable to and from said power source nd removably connected thereto through electrodes on end panels on the car.

This invention relates to silicon carbide furnaces and plants and particularly to a silicon carbide furnace which can be fired in one position, removed to a second position for cooling and unloading and to a plant incorporating a plurality of such furnaces.

In the past silicon carbide has been manufactured in stationary electric furnaces. Such stationary furnace installations usually require four to six furnaces for each transformer in order to utilize the transformer to its maximum efficiency, with one furnace heating, one being unloaded, one loading, and the remainder cooling. This requires very large capital investment in buildings and furnaces. The unloading of such furnaces is quite difficult and tedious because of the adjacent hot furnaces and because of the necessity of using large amounts of hand labor to remove the silicon carbide from the furnace due to the proximity of the adjacent furnaces and the difficulty of using mechanical unloading equipment in the restricted floor space available. This also requires that the furnaces be cooled in extraordinary long time before unloading in order to get the temperature down to the point where the hand labor can be effectively used. A further problem arises in the loading of such furnaces because of the adjacent other furnaces. This means lengthy conveyor belts from the mixing bins to the furnaces or overhead cranes carrying successive bucket loads to the furnace.

We have invented a silicon carbide furnace and plant which eliminates these problems and makes it possible to produce a given quantity of silicon carbide in a plant area less than ⅓ the size of that required by conventional methods.

Preferably we provide an electrical power source, a main trackway adjacent said power source, a furnace bottom mounted on wheels on said trackway movable to and away from said power source; said furnace bottom having a substantially flat heat resistant surface, removable sides along each side of said surface and removable ends on said surface, said sides and ends defining a heating chamber, electrode means in each of said ends, removable connections between said electrode ends and said power source, a transfer car movable transversely to the main trackway and having a corresponding trackway adapted to be aligned with the main trackway to receive the furnace bottom wheels and furnace whereby said furnace may be moved transversely to said main trackway, a service area spaced from said main trackway by said transfer car, secondary trackways in said service area receiving said furnace from said transfer car, loading means at said service area adapted to load said furnace and a cooling and unloading section in said service area spaced from the loading means. Preferably the loading means is a gravity discharge hopper or the like located over a trackway adapted to receive a furnace to be loaded from the transfer car. Other loading device and conveying equipment, may of course, be used. The removable ends of said furnace are preferably provided with cooling means removably connected to a source of coolant adjacent the power source whereby the electrodes in the ends can be cooled.

In a preferred embodiment, the sides are a plurality of side-by-side cast iron panels lined with refractory and removed and replaced by crane, loader or similar lifting device.

In the foregoing general description of our invention we have set out certain objects, purposes and advantages of our invention. Other objects, purposes and advantages will be apparent from a consideration of the following description and the accompanying drawings in which.

Figure 1:
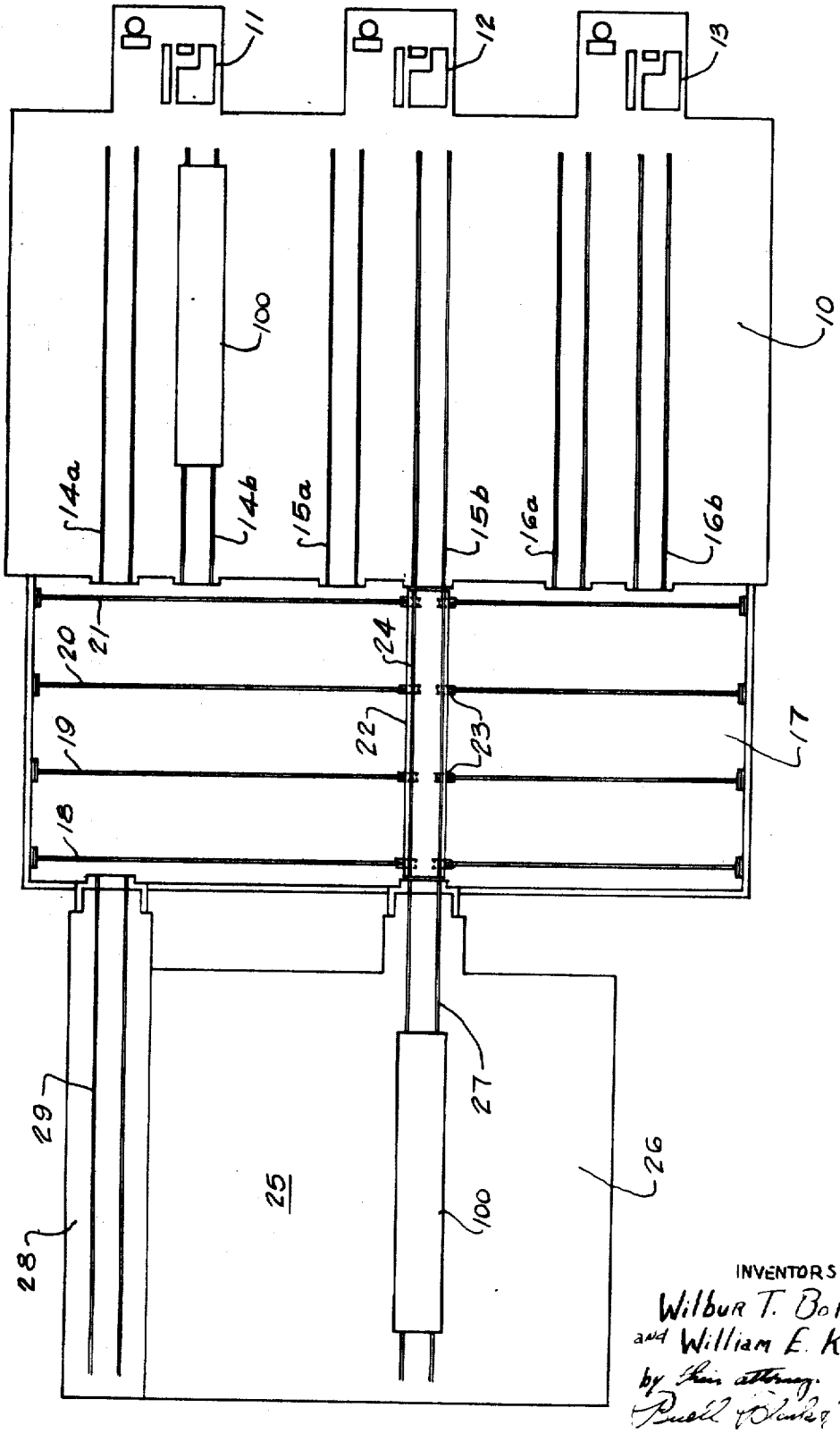
FIG. 1 is a plan view of a silicon carbide plant floor according to our invention.
Figures 2, 6:
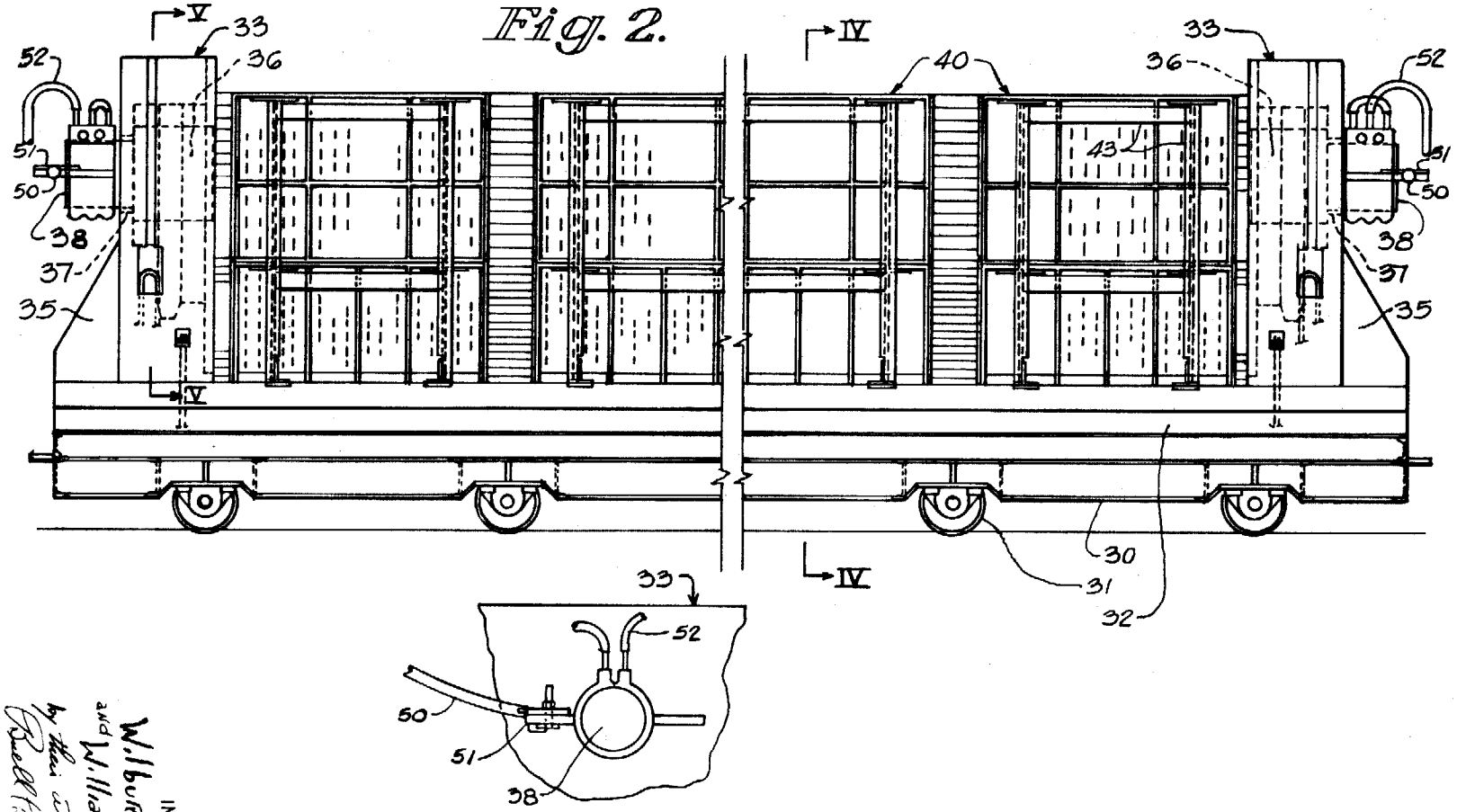
FIG. 2 is a side elevation of a silicon carbide furnace according to our invention.
FIG. 6 is an enlarged fragment elevation of the furnace end and clamping device.
Figure 3:
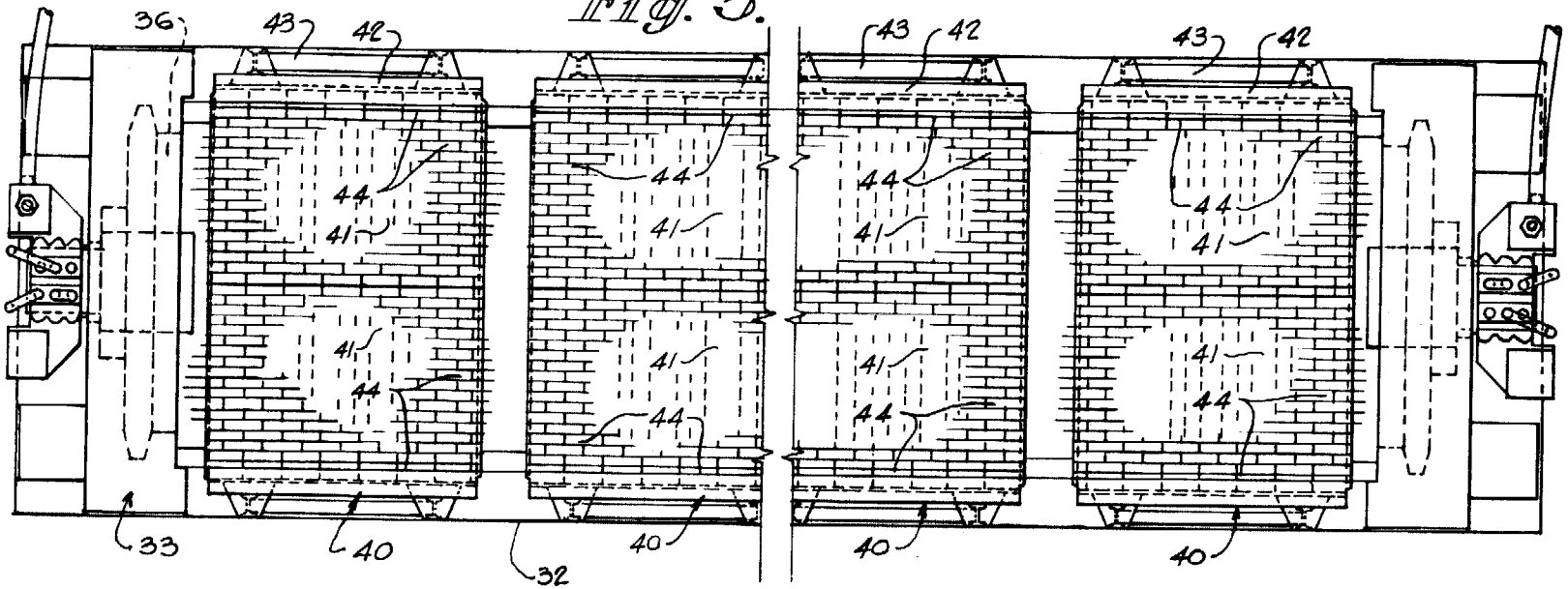
FIG. 3 is a top plan view of the furnace of FIG. 2.
Figure 4:
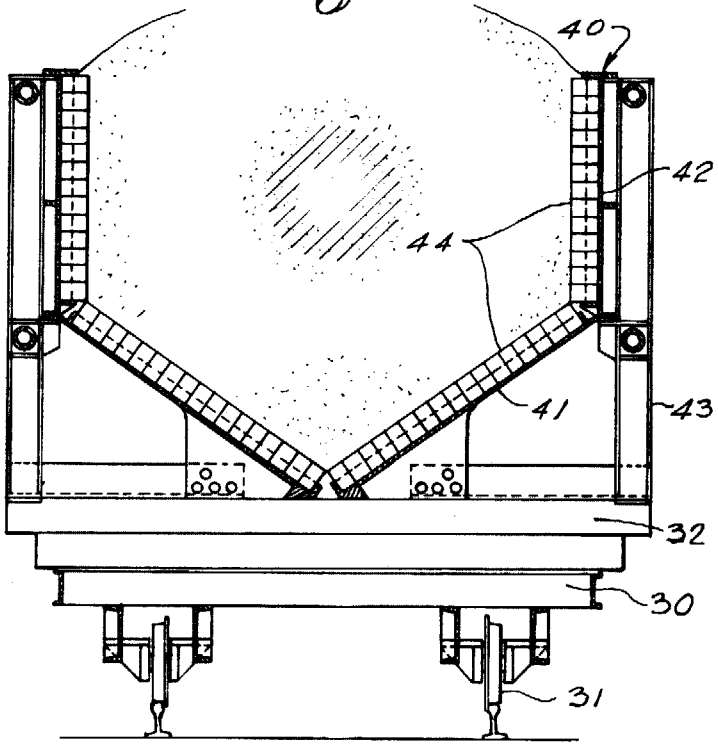
FIG. 4 is a section on the line IV—IV of FIG. 2.
Figure 5:
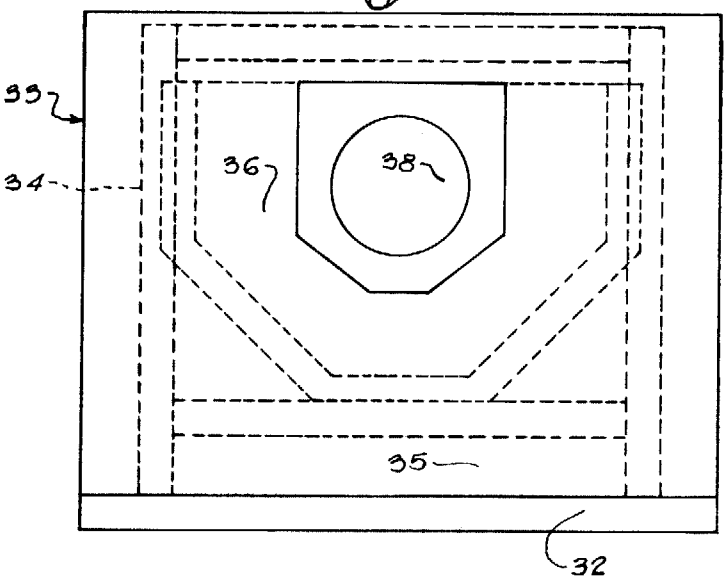
FIG. 5 is a section on the line V—V of FIG. 2.

Referring to the drawings we have illustrated in FIG. 1 a furnace building floor 10 having three transformer units 11, 12, and 13. Adjacent each transformer unit is a pair of trackways 14a–14b, 15a–15b, and 116a–16b each made up of spaced rails. A transfer pit 17 is provided at the end of the trackways remote from transformer units and extending transverse to the length of the trackways. Rails 18, 19, 20 and 21 are provided in the pit to carry a transfer car 22 mounted on wheels 23 riding on rails 18, 19, 20 and 21. A trackway 24 is mounted on the transfer car 22 level with the plane of trackways 14a–14b, 15a–15b, and 16a–16b and adapted to be selectively aligned with any one of said trackways by movement of the transfer car. The transfer car is driven by any of various well-known drive means from end to end of pit 17 to align trackway 24 with the furnace floor trackways. A service area 25 is provided adjacent pit 17 on the side opposite furnace floor 10. The service area is provided with a stripping floor 26 having a trackway 27 on the same plane as trackways 14a–14b, 15a–15b, and 16a–16b. A loading floor 28 is also provided in service area 25 and it too is provided with a trackway 29 on the same plane as trackways 14a–14b, 15a–15b, and 116a–16b. Both trackways 27 and 29 terminate at pit 17 so that trackway 24 on transfer car 22 may be aligned with them. An overhead loading hopper (not shown) is provided adjacent trackway 29 to discharge by gravity over trackway 29.

A furnace car 100 having a furnace bottom 30 mounted on wheels 31 is adapted to move on wheels 31 on the several trackways 14a–14b, 15a–15b, 16a–16b, 24, 27 and 29. A heat resistant surface 32 is provided on the bottom 30. This surface may be of cast concrete, brick or any of various well-known refractory materials. Identical end panels 33 are removably mounted on each end of the bottom 30. These end panels are made up of a steel frame 34 carrying a cast concrete end member 35 having a refractory face 36 of high temperature brick or like refractory material and provided with an opening 37 receiving an electrode 38.

A plurality of removable side panels 40 extend along each side of the bottom between the two end panels 33 to form a trough-like receptacle. The side panels 40 are made up of an inclined bottom plate 41 and vertical side plate 42 of cast iron or like material carried by a supporting frame 43. The bottom plate 41 and side plate 42 are lined with refractory brick 44. The two bottom plates 41 from opposite sides meet generally at the center line of bottom surface 32 to form a generally U-shaped bottom on the receptacle. The electrodes 38 are connected to transformers 11, 12 or 13 by means of cables 50 and busbars 50a, each busbar serving a pair of furnaces, and removable electrode clamps 51. The clamps 51 are preferably water cooled by water introduced into passages in the clamps by water line 52.

The operation of the plant and furnace of our invention is as follows. The end panels 33 with electrodes 38 mounted in openings 37 are placed on bottom surface 32. The side panels 40 are then placed on bottom surface 32 to complete the furnace. The end panels and side panels may be placed in position by a high-lift, overhead crane, traveling floor crane or like device. This work is done on the trackway 27 on the stripping floor. The furnace car is then moved from trackway 27 onto trackway 24 on transfer car 22 by means of a high-lift, a winch and cable or any of well known means. The transfer car 22 is then moved to trackway 29 where the furnace car is moved onto trackway 29 and loaded by gravity. The furnace charge is a conventional charge for the Acheson process, i.e., silica and carbon around a carbon electrode core. In the meantime a furnace car ready for stripping may be moved into the stripping area as described hereafter. The furnace car is loaded from the hopper previously described or by some other conventional means and is then returned to the transfer car which is moved to one of trackways 14a–14b, 15a–15b, or 16a–16b. The loaded car is moved onto one of the furnace floor trackways to a position adjacent one of the transformers 11, 12 and 13. Clamps 51 are applied to electrodes 38 which are in contact with carbon electrode cores 60 of the furnace charge. The electrical current is applied from the transformer along with water coolant for the clamp. When the charge has been heated to the required temperature and time for conventional Acheson process silicon carbide, the electrical current is stopped and the clamps are removed from electrodes 38. The clamps are then moved to a furnace car on the next adjacent track of a pair of example 14a–14b. This adjacent car is then heated while the just completed car cools. Prior to completion of the heating process on the second adjacent car, the first car is removed from the furnace floor trackway onto transfer car 22 and from there to trackway 27 on the stripping floor and a newly loaded car position in its place ready to receive the clamps 51 on completion of the second car.

When the furnace car is moved onto trackway 27, the side panels 40 are lifted off the bottom surface and the contents of the car pushed off bottom surface 32 onto the stripping floor 26 by means of a high-lift or like device and moved to a storage or loading area. The side panels 40 are replaced and the car is ready to repeat the cycle.

The advantage in time saved and labor saved as well as capital investment in buildings and fixed furnaces by our invention will be obvious to persons familiar with conventional silicon carbide plants. Hand labor is substantially eliminated in the plant of our invention whereas it makes up a very large part of the conventional practices. Much time is saved because unloading can be done at much higher temperatures by the simple expedient of pushing the completed charge off the flat bottom car surface rather than digging it piece by piece from the fixed furnaces of the prior art and loading it in the restricted areas between such furnaces.

While we have illustrated and described certain preferred embodiments and practices of our invention it will be understood that this invention may be otherwise embodied within the scope of the following claims.

We claim:

1. A silicon carbide manufacturing plant comprising an electrical power source, a main trackway adjacent said power source, a furnace car movable on said trackway to and from said power source, a refractory bottom on said car, removable side and end panels on said refractory bottom of said furnace car, said side and end panels being interconnected to form a heating chamber on said car, electrode means in each end panel, removable connections between said power source and electrode means, a transfer car movable on a trackway extending transversely to the main trackway, said transfer car carrying a trackway corresponding to said main trackway and alignable with the main trackway receiving the furnace car therefrom, a service area opposite the main trackway and spaced from said main trackway by said transfer car, a secondary trackway on said service area receiving said furnace car from said transfer car trackways, loading means in the service area for loading said heating chamber while on said secondary trackway and an unloading section in said service area spaced from the loading means and receiving a completed furnace charge from said furnace car.

2. A silicon carbide manufacturing plant as claimed in claim wherein cooling means are provided on each electrode.

3. A silicon carbide manufacturing plant as claimed in claim 1 wherein the loading means includes an overhead receptacle above a portion of said secondary trackway.

4. A silicon carbide manufacturing plant as claimed in claim 1 wherein a pair of trackways are provided adjacent each power source, each trackway receiving a furnace car.

5. A silicon carbide manufacturing plant as claimed in claim 1 wherein said transfer car is movable on tracks in a pit transverse to the main trackway.

6. A silicon carbide manufacturing plant as claimed in claim 1 wherein the side panels include an inclined lower portion terminating adjacent the center line of the car.

7. A silicon carbide manufacturing plant as claimed in claim 1 having clamp means removable engaging said electrode means in each end panel, connections between said clamp means and said source of electrical power, cooling means on said clamp means, a source of coolant, and connections from said source of coolant to said cooling means.

8. A silicon carbide manufacturing plant as claimed in claim 7 wherein the cooling means are coolant passages within the clamp means.

9. In a silicon carbide manufacturing plant having an electrical power source, and a main trackway adjacent said power source, the improvement comprising a furnace car adapted to move on said trackway to and from said power source, a refractory bottom on said car, removable side and end panels on said refractory bottom of said furnace car, said side and end panels being interconnected to form a heating chamber on said car, electrode means in each end panel, removable connections between said power source and electrode means, a transverse trackway intersecting said main trackway at a level below the main trackway and carrying a movable transfer car having a trackway alignable with the main trackway, a service area spaced from said main trackway by a transfer car, a secondary trackway in said service area receiving said furnace car from said transfer car loading means in the service area adapted to load said heating chamber while on said secondary trackway and an unloading section in said service area spaced from the loading means and receiving a completed furnace charge from said furnace car.

10. In a silicon carbide manufacturing plant as claimed in claim 9 wherein the electrode connections are provided with cooling means.

*11. A silicon carbide manufacturing plant comprising an electrical power source, a main trackway area adjacent said electrical power source, a plurality of spaced apart first trackways on said main trackway area, a furnace car movable on each said track to and from said power source, a refractory bottom on each such car, removable side panels on said refractory bottom of said furnace car, end panels on said refractory bottom, said side and end panels being interconnected to form a heating chamber on said car, electrode means in each end panel, removable connections between said power source and the electrode means, a service area spaced from said main trackway area, second trackway on said service area on which said furnace cars are movable, transfer means between the first trackway and the second trackway selectively delivering a furnace car from one to the other, loading means in the service area for loading said heating chamber while on said second trackway and an unloading section in said service area spaced from the loading means and receiving a completed furnace charge from said furnace car.*

*12. A silicon carbide manufacturing plant comprising an electrical power source, a main trackway area adjacent the electrical power source, a plurality of spaced apart first trackways on the main trackway area, a plurality of furnace cars selectively movable on each said track to and from the power source, a refractory bottom on each said car, removable side panels on the refractory bottom of each furnace car, end panels on said refractory bottom, the side and end panels being interconnected to form a heating chamber on said car, electrode means in each end panel, removable connections between the power source and the electrode means, a service area spaced from the main trackway area, second trackway on the service area on which the furnace cars are movable, a transfer area intermediate the service area and the main trackway area and trackway means in the transfer area for selectively connecting a track of the main trackway with a track of the service area whereby a furnace car may be selectively routed for movement between any trackway on the main trackway area and the trackway on the service area.*

*13. A silicon carbide manufacturing plant comprising an electrical power source, a main trackway area adjacent said electrical power source, a plurality of spaced apart trackways on said main trackway area, a furnace car movable on each said trackway to and from said power source, a refractory bottom on each such car, removable side panels on said refractory bottom of said furnace car, end panels on said refractory bottom, said side and end panels being interconnected to form a heating chamber on said car, electrode means in each end panel, removable connections between said power source and the electrode means, a service area spaced from said main trackway area, trackway means on said service area on which said furnace cars are movable, transfer means between the main trackway area and the service area selectively delivering a furnace car from a trackway on one to a trackway on the other, loading means in the service area for loading said heating chamber while on a trackway on said service area and an unloading section in the service area spaced from the loading means and receiving a completed furnace charge from said furnace car.*

*14. A silicon carbide manufacturing plant comprising an electrical power source, a main trackway area adjacent said electrical power source, a plurality of spaced apart trackways on said main trackway area, a furnace car movable on each said trackway to and from said power source, a refractory bottom on each such car, removable side panels on said refractory bottom of said furnace car, end panels on said refractory bottom, said side and end panels being interconnected to form a heating chamber on said car, electrode means in each end panel, removable connections between said power source and the electrode means, a service area spaced from said main trackway area, trackway means on said service area on which said furnace cars are movable, translatory track means between the main trackway area and the service area selectively conveying a furnace car from a trackway on one to a trackway on the other, loading means in the service area for loading said heating chamber while on a trackway or said service area and an unloading section in the service area spaced from the loading means and receiving a completed furnace charge from said furnace car.*

References Cited

The following references, cited by the Examiner, are of record in the patented file of this patent or the original patent.

UNITED STATES PATENTS

| | | | |
|---|---|---|---|
| 2,122,469 | 7/1938 | Hitner | 13—6 |
| 2,159,286 | 5/1939 | Moore | 13—1 |
| 2,263,549 | 11/1941 | Peyches | 13—6X |
| 2,629,756 | 2/1953 | Wilkins et al. | 13—33X |
| 2,694,097 | 11/1954 | Collin | 13—34X |
| 2,899,476 | 8/1959 | Gell | 13—6 |
| 3,155,758 | 11/1964 | Hill | 13—25 |
| 3,305,619 | 2/1967 | Molstedt et al. | 13—6UX |

OTHER REFERENCES

The Manufacture of Iron & Steel, vol. 3, Chapman & Hall, Ltd., London, 1960, pp. 83, 84.

BERNARD A. GILHEANY, Primary Examiner

R. N. ENVALL, Jr., Assistant Examiner

U.S. Cl. X.R.

13—33

UNITED STATES PATENT OFFICE

CERTIFICATE OF CORRECTION

Patent No. Reissue No. 27,018 Dated January 5, 1971

Inventor(s) Wilbur T. Bolkcom et al.

It is certified that error appears in the above-identified patent and that said Letters Patent are hereby corrected as shown below:

Column 1, line 23, "nd" should read -- and --. Column 2, line 38, "116a" should read -- 16a --; line 57, "116a" should read -- 16a --. Column 4, line 29, after "claim" insert -- 1 --.

Signed and sealed this 25th day of May 1971.

(SEAL)
Attest:

EDWARD M.FLETCHER,JR.
Attesting Officer

WILLIAM E. SCHUYLER, JR.
Commissioner of Patents

USCOMM-DC 60376-P69
☆ U.S. GOVERNMENT PRINTING OFFICE : 1969 O—366-334